United States Patent [19]

Oldridge

[11] Patent Number: 5,544,444
[45] Date of Patent: Aug. 13, 1996

[54] SINGLE CURTAIN WINE AND JUICE GRAPE VINE PRUNER

[76] Inventor: Tommy L. Oldridge, 1118 Concord St., Lowell, Ark. 72745

[21] Appl. No.: 361,289

[22] Filed: Dec. 22, 1994

[51] Int. Cl.[6] .................................................. A01G 7/00
[52] U.S. Cl. ........................... 47/4; 56/1; 56/242; 56/298
[58] Field of Search ........................... 47/4; 56/242, 243, 56/298, 307, 308, 1

[56] References Cited

U.S. PATENT DOCUMENTS

| | | | |
|---|---|---|---|
| 1,555,398 | 9/1925 | Brundert | 56/247 |
| 3,507,101 | 4/1970 | Bernshausen | 47/4 |
| 4,777,787 | 10/1987 | Warren | 47/4 |

FOREIGN PATENT DOCUMENTS

| | | | |
|---|---|---|---|
| 2298269 | 9/1976 | France | 47/4 |
| 2305120 | 10/1976 | France | 47/4 |
| 3838703 | 5/1990 | Germany | 47/4 |
| 719556 | 3/1980 | U.S.S.R. | 47/4 |
| 882477 | 11/1981 | U.S.S.R. | 47/4 |
| 138269 | 3/1988 | U.S.S.R. | 47/4 |

Primary Examiner—Henry E. Raduazo
Attorney, Agent, or Firm—Frank J. Catalano; Scott R. Zingerman

[57] ABSTRACT

A vine cane pruner has a frame with four hedgers mounted on the frame. First and third hedgers are mounted on opposite sides of the frame with cutting teeth extending forwardly. Gathering mechanisms mounted on the first and third hedgers engage vertical canes on opposite sides of the vine and draw the engaged vertical canes into the cutting teeth of the first and third hedgers. Second and fourth hedgers are mounted on opposite sides of the frame and rearwardly of the first and third hedgers with cutting teeth extending forwardly. Gathering mechanisms mounted on the second and fourth hedgers engage the horizontal canes on opposite sides of the vine and draw the engaged horizontal canes into the cutting teeth of the second and fourth hedgers. A telescoping mast connected between the frame and a transport vehicle supports the frame and permits it to be selectively raised and lowered. A telescoping boom connected between the frame and the transport vehicle permits selective shifting of the frame laterally closer to and further from the vehicle. Independently telescoping arms connected between the frame and the hedgers permits selective varying of the lateral distance between the hedgers.

24 Claims, 9 Drawing Sheets

SINGLE CURTAIN WINE AND JUICE GRAPE VINE PRUNER

BACKGROUND OF THE INVENTION

This invention relates generally to grape vine grooming and more particularly concerns apparatus for pruning single curtain wine and juice grape vines.

Proper grooming of vines having a drooping growth habit renders the vines more active photosynthetically and allows greater penetration of light into the fruit zone and lower buds. Increased light in the vine improves fruit quality and productivity.

Manual pruning of the vines is impractical because of the cost and difficulty in obtaining adequate hand labor to accomplish the task in a timely manner. Mechanical hedging as presently known is merely horizontal and vertical cutting which does not distinguish the type of growth removed in the process. Desirable dormant one-year old mature canes are removed together with the undesirable lateral canes which cause shading and prevent adequate sunlight exposure and inferior, weak and shaded canes which are not productive of quality fruit. Proper pruning is a selective process of reducing bud numbers while retaining premium quality fruiting buds on one year old canes.

It is, therefore, an object of this invention to provide a mechanical pruner for automatically pruning single curtain grape vines. Another object of this invention is to provide a mechanical pruner which is selective to retain the premium quality fruiting buds on one-year old canes. A further object of this invention is to provide a mechanical pruner which shields dormant one-year old mature canes out of the path of the pruning cutters. It is also an object of this invention to provide a mechanical pruner which selectively removes inferior, weak and shaded canes.

SUMMARY OF THE INVENTION

In accordance with the invention, a grape vine cane pruner includes a housing and an endless spine journalled for travel in the housing with a plurality of prongs spaced apart and radiating from the spine extending outwardly from the housing. The prongs are selected for flexibility and length to permit the gathering of canes as the prongs are driven through the vine. A reciprocating hedger is mounted on the housing with its cutting teeth positioned to receive the canes gathered by the prongs as they rotate through the vine. The angular relationship of the reciprocating hedger to the path of travel of the cane prongs is selected to suit the direction of the canes to be pruned. That is, the pruners are structurally arranged to accommodate either vertical or horizontal canes.

The invention further contemplates the mounting of a pair of such pruning devices, one arranged for the pruning of vertical canes and the other for the pruning of horizontal canes, spaced apart on a suspension carriage so that vertical and horizontal canes can be pruned in a single pass of the device in relation to the vine trellis. The invention further contemplates a second opposite hand arrangement of vertical and horizontal cane pruners spaced apart on the suspension carriage so that the canes on both sides of a trellis can be simultaneously pruned in a single pass of the device.

In a preferred embodiment of the invention, each vertical and horizontal cane pruner is mounted on a separate post, each of which is separately mounted on telescoping arms connected to the suspension carriage so that the lateral extension of the posts and therefore of the pruners from the carriage can be varied as required. The carriage itself is mounted on a telescoping boom so that the lateral position of the carriage in relation to its supporting vehicle can be varied as well. The telescoping boom is connected atop a telescoping mast so that the elevation of the carriage above ground can also be varied. In a particularly preferred embodiment, a trellis sled on the device rides the top of the vine canopy on a pivot arm which controls a switch connected in the mast elevation circuit so that the elevation of the suspension carriage can be automatically varied in response to variations in the height of the grapevine canopy.

The support structures are such that the operator can separately select the elevation of each pruner support post in its telescoping arm and also select the cartesian coordinate orientation of each pruner in relation to the path of travel of the device.

Furthermore, the invention further contemplates the provision of obstacle detection mechanisms on each of the pruning devices which cooperate with biased pivoting structures between the pruning devices and the posts to permit clearance of obstacles during the pruning process.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1 through 4, a preferred embodiment of a single curtain wine and juice grape vine pruning machine includes a main support structure 10, a suspension carriage 30, vertical cane pruners 70 and horizontal cane pruners 130. As shown, the machine is mounted on the front of a tractor and extends laterally of the tractor and over the tractor front tire. Other types of over land vehicles could also be used with suitable modifications in the machine support structure to accommodate the vehicle. It is only necessary that the main support structure 10 supports the suspension carriage 30 in a position above the vine trellis. The suspension carriage 30 in turn supports the vertical cane pruners 70 on opposite sides of and on the forward end of the carriage 30 and the horizontal cane pruners 130 on opposite sides of the carriage 30 and rearwardly of the vertical cane pruners 70. Thus, as the vehicle travels along the single curtain grape vine, the trellis and vine pass first between the vertical cane pruners 70 and then between the horizontal cane pruners 130.

The main support structure 10 includes a telescoping main mast 11 connected at one end to the vehicle chassis and at the other end to a bracket 13. An hydraulic cylinder 15 drives the telescoping mast 11 under the control of a mast solenoid 17, as shown mounted at the forward lower portion of the vehicle. A boom 19 extends horizontally from the bracket 13 and away from the vehicle in a direction transverse to the direction of travel T of the tractor. A second hydraulic cylinder 21 drives the telescoping boom 19 under the control of a second solenoid 23, as shown mounted adjacent the mast solenoid 17. The extended end of the telescoping boom 19 is fitted with a suitable mating connection, as shown a ball joint socket 25, for connecting the main support structure 10 to the suspension carriage 30.

The suspension carriage 30 includes left and right horizontal longitudinal members 31 and 33 spaced apart by forward and rear end members 35 and 37. A ball 39 on an intermediate cross member of the suspension carriage 30, located to properly balance the machine on the boom 19, is seated in the ball joint socket 25 on the boom 19 to connect the suspension carriage 30 to the main support structure 10. As shown, the longitudinal members 31 and 33 parallel the direction of travel T of the vehicle and four telescoping arms 41, 43, 45 and 47 are mounted transversely atop the longitudinal members 31 and 33 at intervals to accommodate the transport vehicle and the pruners 70 and 130. As shown, the forward most arm 41 extends toward the vehicle, the next rearward arm 43 extends away from the vehicle, a more rearward arm 45 extends away from the vehicle and the rearmost arm 47 extends toward the vehicle. The longitudinal spacing between the forwardmost and rearward most arms 41 and 47 accommodates the front tire of the vehicle. Each of the arms 41, 43, 45, and 47 supports a post 49, 51, 53 and 55, respectively, which extends downwardly from the outer end thereof. Hydraulic cylinders 57, 59, 61, and 63 drive their respective telescoping arms 41, 43, 45 and 47 to vary the lateral position of the posts 49, 51, 53, and 55 under the control of a third solenoid 65 mounted at any suitable position on the suspension carriage 30. Preferably, as shown, the elevation of the posts 49, 51, 53, and 55 can be independently adjusted by aligning a selected one of a plurality of apertures 67 in each post with a mating pin extending through its respective post mounting bracket, or by other suitable elevation adjusting means.

Figure 1:
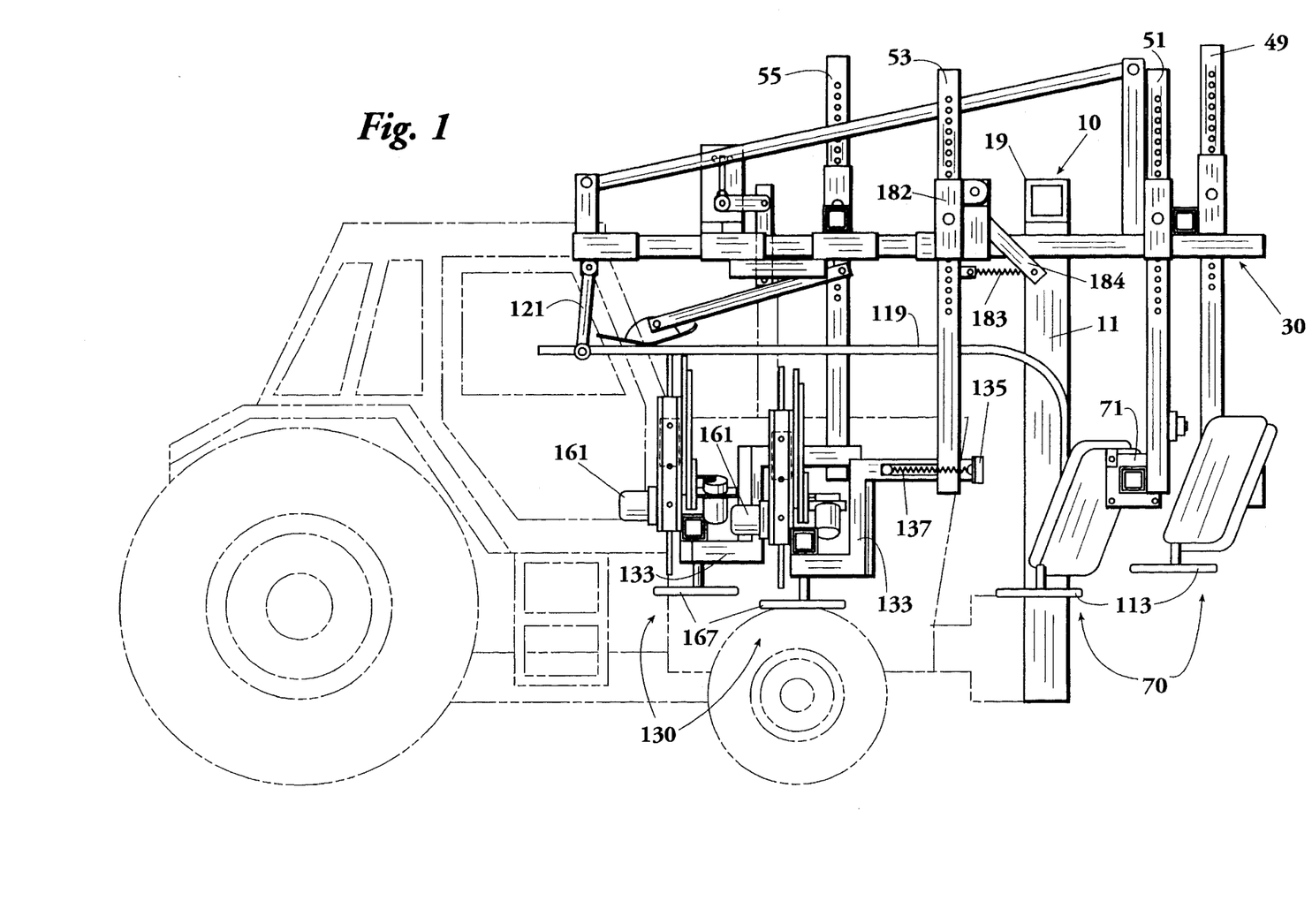
FIG. 1 is a side elevational view of a preferred embodiment of the single curtain grape vine pruner mounted on a tractor.
Figure 2:
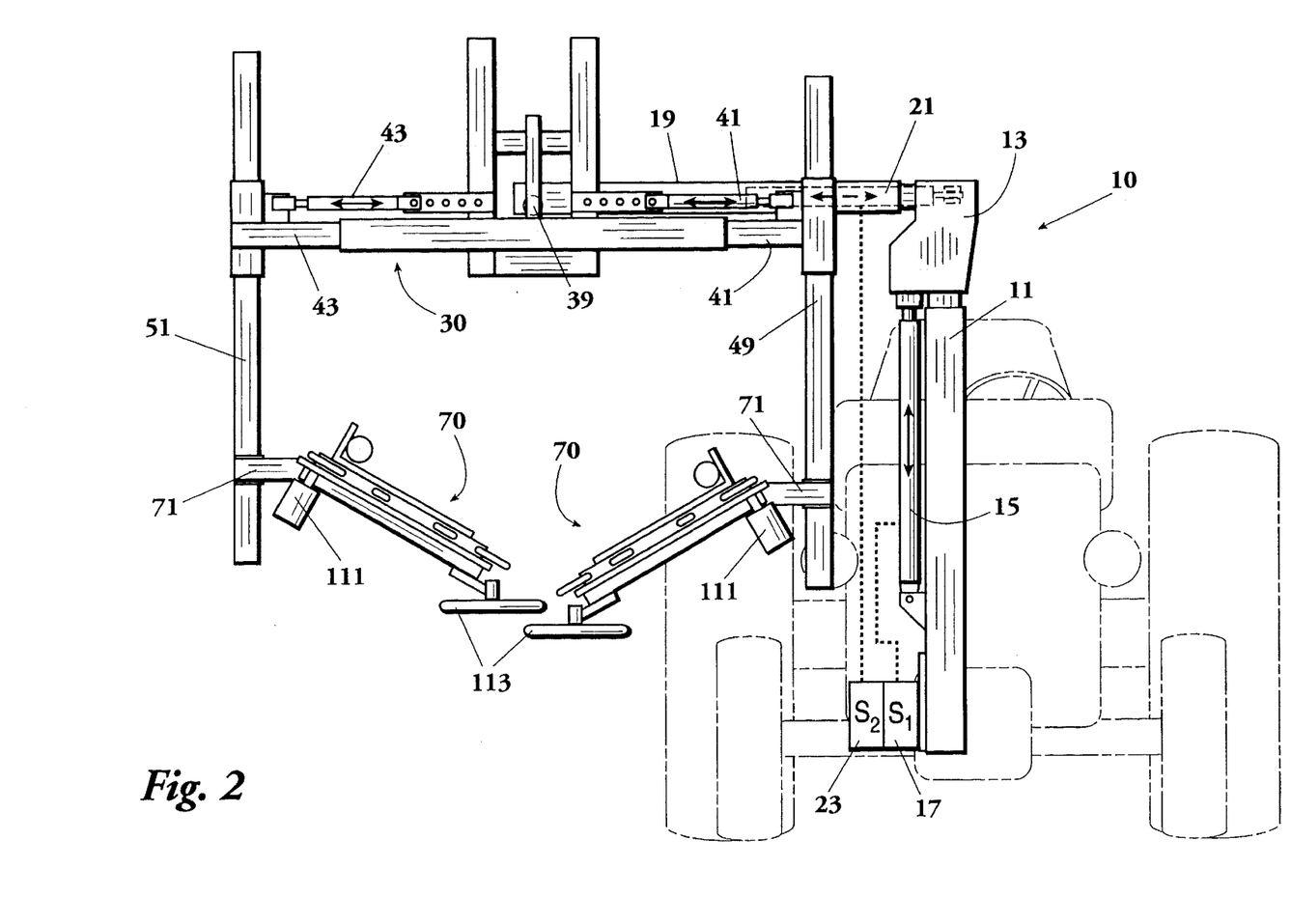
FIG. 2 is a front elevation view of the single curtain grape vine pruner of FIG. 1.
Figure 3:
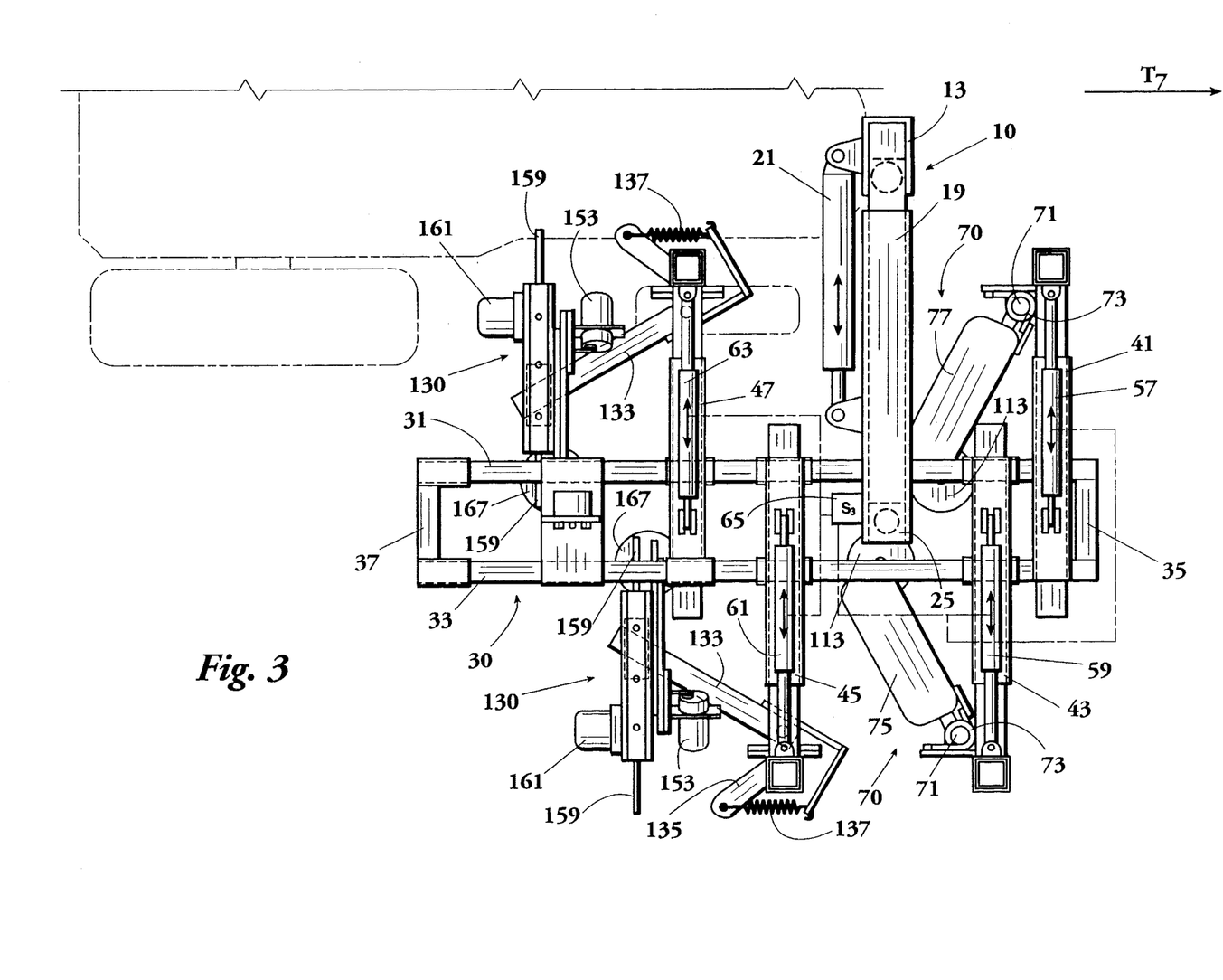
FIG. 3 is a top plan view of the single curtain grape vine pruner of FIG. 1.

As seen in FIGS. 1 through 4, the vertical cane pruners 70 are mounted proximate the lower end of the forward posts 49 and 51 on pivot joints 71, preferably with one pruner 70 being approximately 3" higher than the other and with each preferably biased by a helical torsion spring 73 toward a forwardmost position relative to the path of travel T. Preferably, in the forwardmost position, the vertical cane pruners 70 are angled rearwardly approximately thirty degrees as is best seen in FIG. 3, though they may be transverse to the path of travel T in their forwardmost position, and have approximately a ninety degree range of motion against bias. Also, preferably, the vertical cane pruners 70 are angled downwardly approximately 30 degrees as is best seen in FIG. 2, though they may be maintained at any angle on a 180 degree vertical range. Preferably, the pivot joints 71 accommodate the selective adjustment of the forwardmost and vertical and horizontal angles depending on the application. Any suitable connection or joint may be used provided the desired attitude, range of motion and bias of the vertical cane pruners 70 are achieved.

Figure 4:
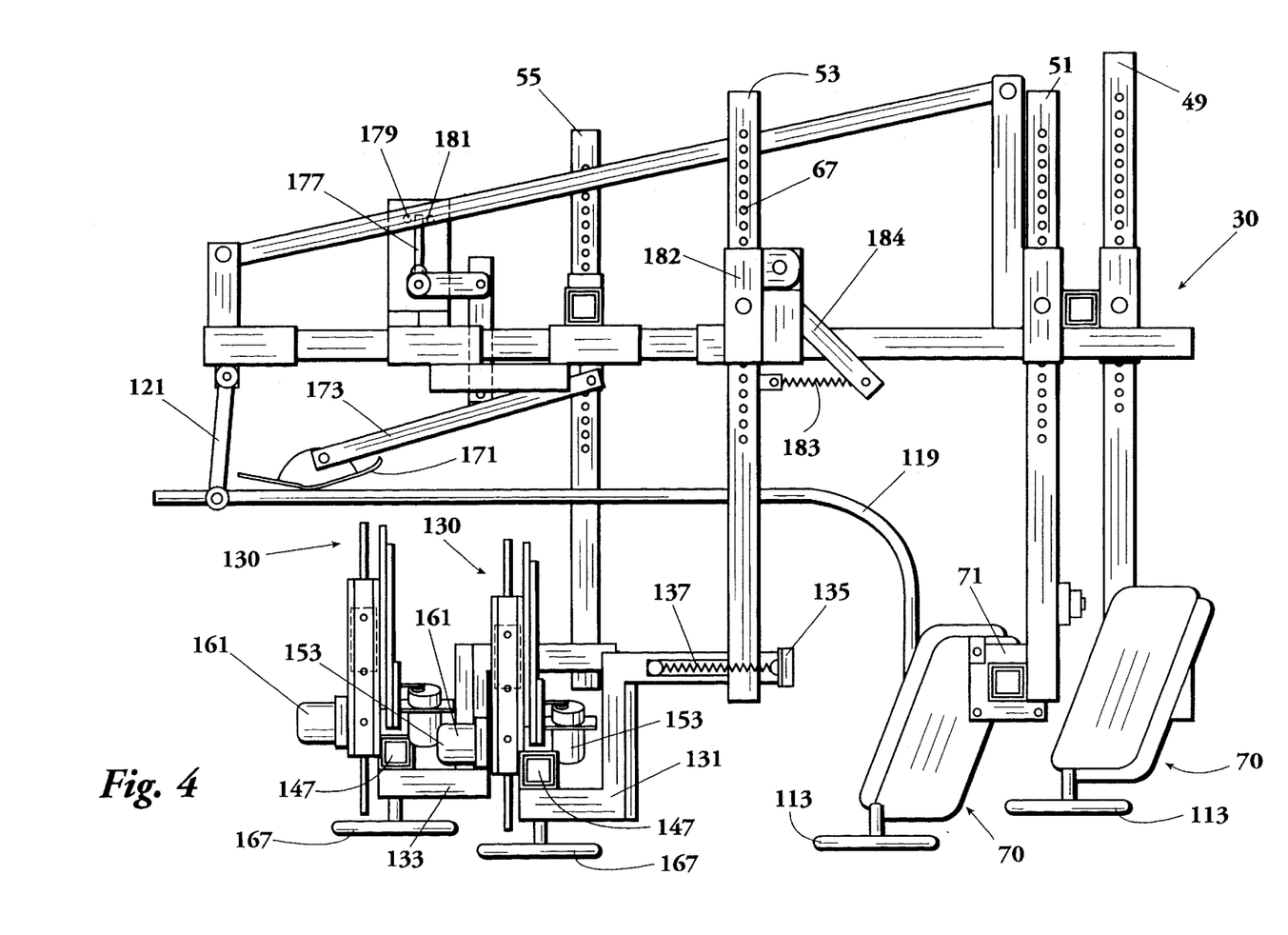
FIG. 4 is a side elevation view of the suspension carriage, posts and pruners of the single curtain grape vine pruner of FIG. 1.
Figure 5:
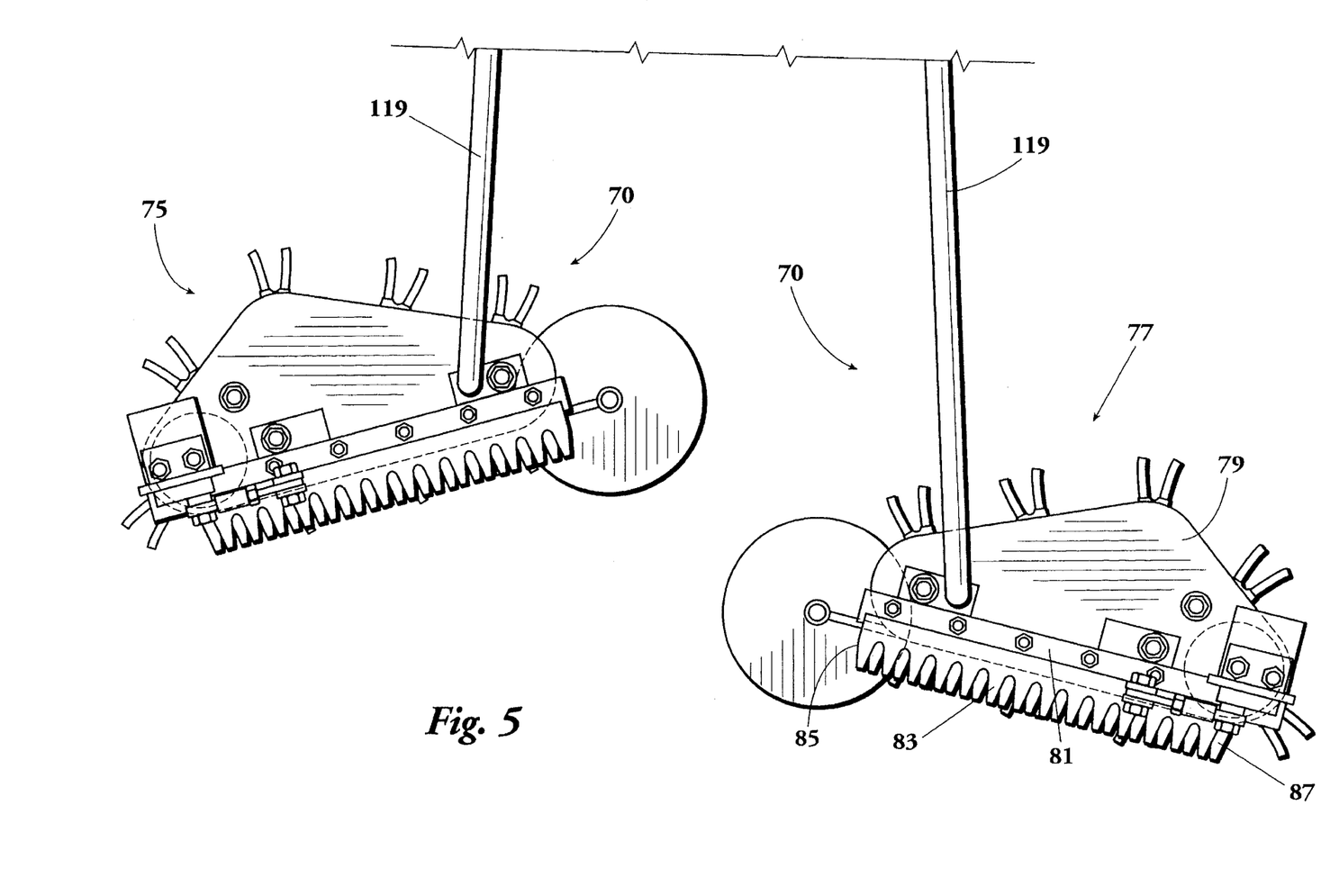
FIG. 5 is a top plan view of the vertical cane pruners of the single curtain grape vine pruner of FIG. 1.
Figure 6:
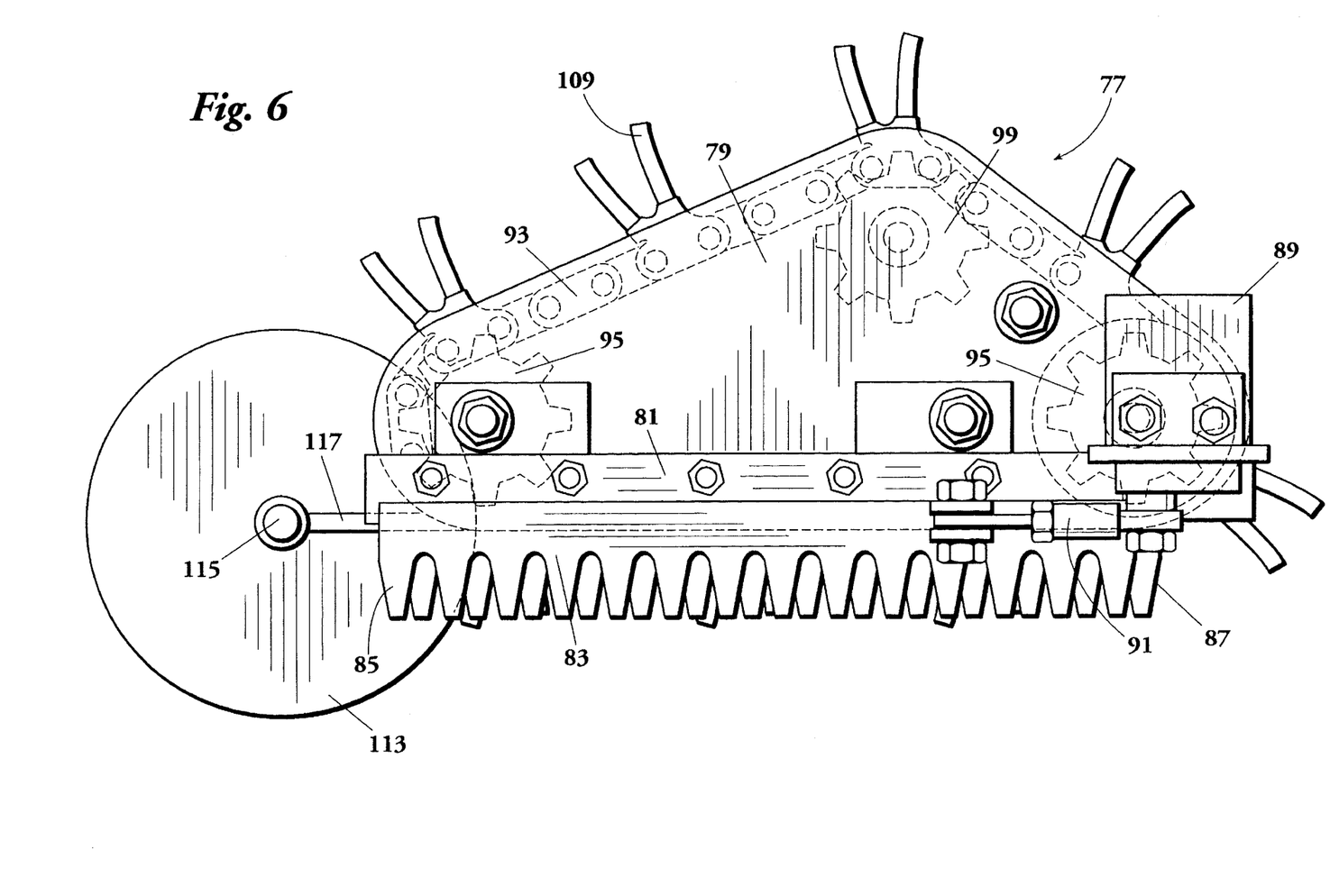
FIG. 6 is an enlarged top plan view of a typical vertical cane pruner of FIG. 5.
Figure 7:
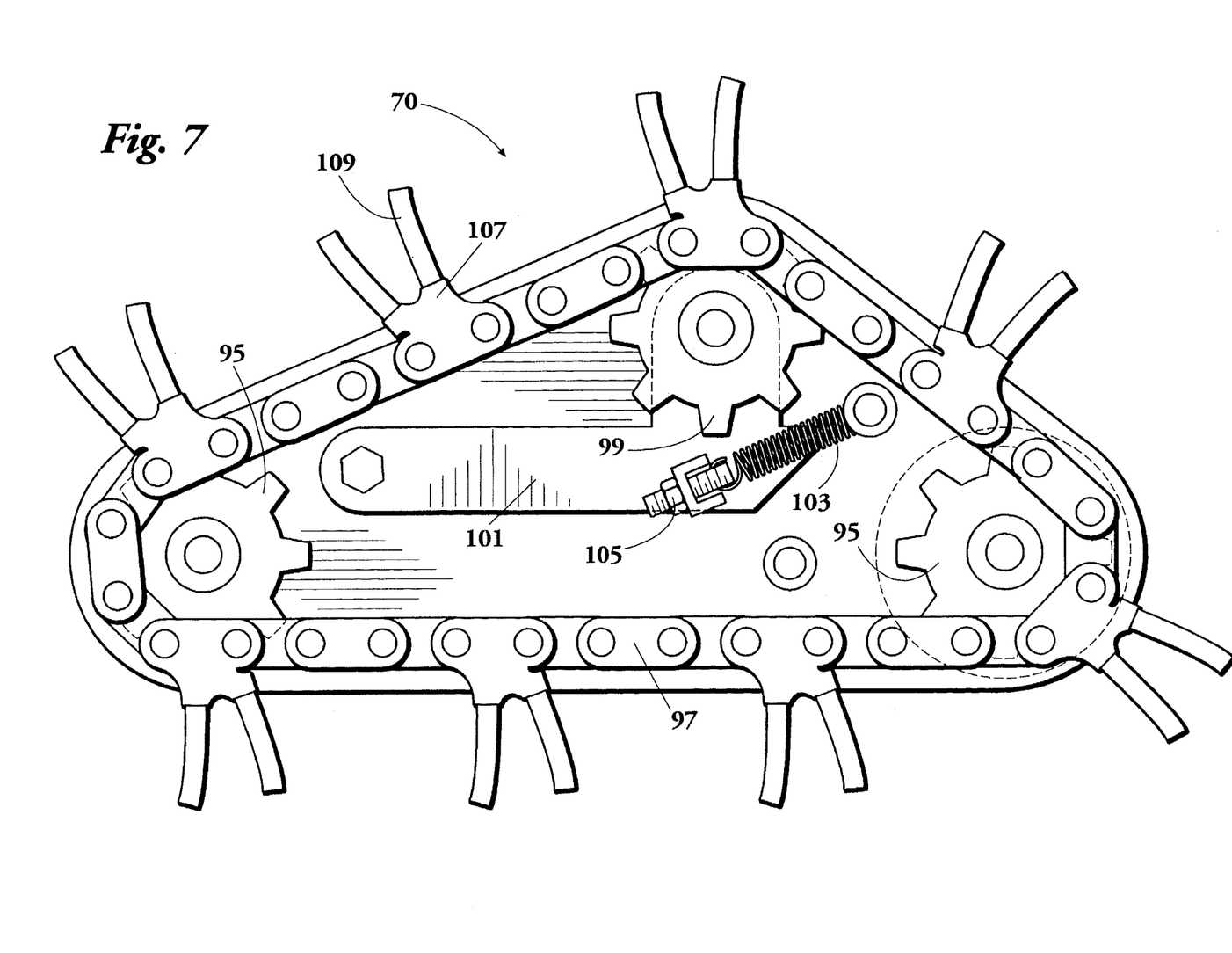
FIG. 7 is a top plan view of the vertical cane pruner of FIG. 5 with the housing cover removed.

The vertical cane pruners 70 are illustrated in greater detail in FIGS. 5 through 7. As can best be seen in FIG. 5, the outboard pruner 75 is opposite hand to the inboard pruner 77 which is further illustrated in FIGS. 6 and 7. The pruner 77 consists of a housing 79 with a substantially planar reciprocating hedger 81 mounted on the housing 79 with its cutting teeth 83 extending forwardly of the housing 79 from a cane inlet end 85 to a cane outlet end 87 of the hedger 81. As shown, a cutter drive motor 89, preferably hydraulic, is connected by a suitable linkage 91 for driving the sliding tooth plate of the hedger in relation to the fixed tooth plate of the hedger 81. However, a hedger in which both plates reciprocate could be used as well. An endless spine, such as the continuous bicycle type chain 93 shown, is journalled in the housing 79 along a continuous planar path defined in part by a pair of sprockets 95 establishing a forward leg 97 of the planar path which extends substantially parallel to, below and rearward of the cutting teeth 83 of the hedger 81 for at least a substantial portion of the length of the hedger 81. Preferably, tension in the chain 93 is maintained by a third sprocket 99 mounted on a pivoted arm 101 which is biased by a coil spring 103, the spring 103 preferably having a tension adjustment mechanism 105 for reasons to be hereinafter explained. As shown, selected links of the chain 93 are equipped with fittings 107 in which prongs 109 are mounted and radiate outwardly from the spine 93 and forwardly of and below the cutting teeth 83 and beyond the inlet end 85 of the hedger 81 as the prongs 109 travel along the forward leg 91 of the continuous path of the spine 93. Suitable lengths of three-eighths inch rubber hose, preferably extending approximately four to twelve inches beyond the hedger 81, have been found to be well suited for use as prongs 109. As can best be see in FIG. 2, the spine 93 is driven by a motor 111, preferably hydraulic, mounted on the housing 79 and engaged with one of the sprockets 95 so as to cause the spine 93 to rotate along the forward leg 97 in a direction from the inlet end 85 to the outlet end 87 of the hedger 81. As can best be seen in FIGS. 2 and 6, the vertical cane pruners 70 also include a horizontal disk 113 rotatively mounted on a shaft 115 which is in turn connected to a suitable support frame 117 connected to the housing 79. As shown, the disks 113 are preferably maintained in a horizontal condition and the support frame 117 is preferably adjustable so that this horizontal condition can be maintained regardless of the selected attitude of the vertical cane pruner 70. Preferably, the disks 113 partially vertically overlap in their forwardmost position. As can best be seen in FIGS. 1, 4 and 5, a shielding rod 119 rises vertically from its connection to the housing 79 and then extends substantially rearwardly and horizontally to an arm 121 pivotally connected at one end to the suspension carriage 30 and at its other end to the shielding rod 119 for reasons to be hereinafter explained.

As can best be seen in FIGS. 1, 3 and 4, the horizontal cane pruners 130 are mounted proximate the lower end of the rear posts 53 and 55, preferably with one pruner 130 approximately 3" higher than the other, on Z-shaped support arms 131 and 133, respectively, by pivot joints 135, each preferably biased by a helical torsion spring 137 toward a forwardmost position relative to the path of travel T. Preferably, when the arms 131 and 133 are in their forwardmost position relative to the path of travel T under the bias of the springs 137, the horizontal cane pruners 130 extend along a plane transverse to the path of travel T. However, the horizontal pruners 130 may, when the arms 131 and 133 are in their forwardmost position, be in an alignment other than transverse to the direction of travel T and the arms may be, and preferably are, free to move under bias from an alignment in which the horizontal cane pruners 130 are transverse to an alignment in which they have rotated ninety degrees against the bias. Also preferably, the horizontal cane pruners 130 may be set at any desired angles relative to the horizontal and lateral in relation to the path of travel T. Preferably, the pivot joints 135 accommodate the selective adjustment of the forwardmost lateral and vertical angles depending on the application. As with the vertical cane pruners 70, any suitable connection or joints may be used provided the desired attitude, range of motion and bias of the horizontal cane pruners 130 are achieved.

Figure 8:
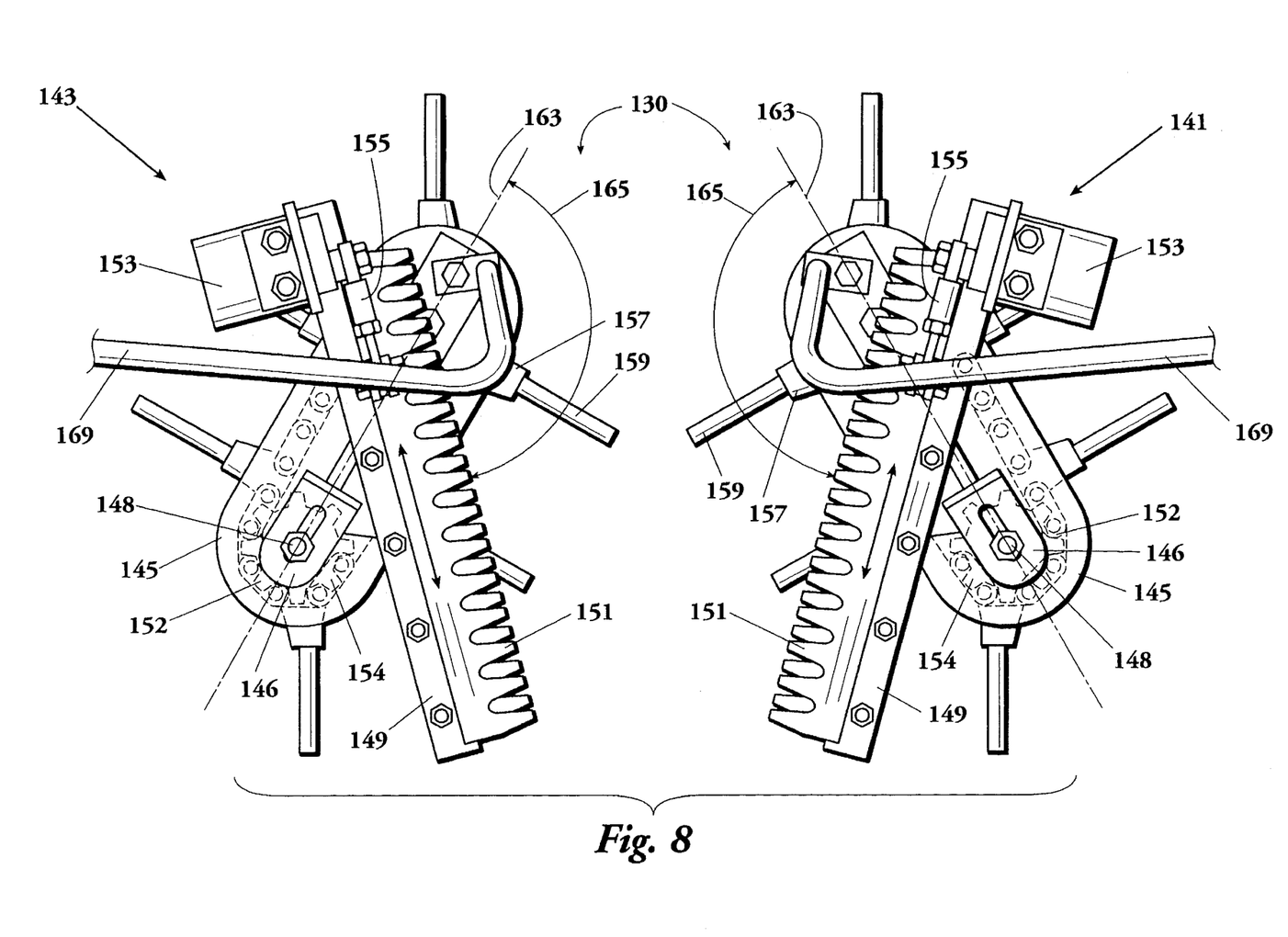
FIG. 8 is a front elevation view of a preferred embodiment of the horizontal cane pruners of the single curtain grape vine pruner of FIG. 1.

The horizontal cane pruners 130 are shown in greater detail in FIG. 8. The outboard pruner 141 is opposite hand to the inboard pruner 143. Each consists of a housing 145 mounted on a telescoping arm 147 extending inwardly relative to the pruning machine from the support arms 131 and 133. A substantially planar reciprocating hedger 149 is mounted on the housing 145 with its cutting teeth 151 facing substantially inwardly in relation to the pruning machine. As shown, a cutter drive motor 153, preferably hydraulic, is connected by a suitable linkage 155 for driving the sliding tooth plate of the hedger 149, although a hedger in which both plates reciprocate could also be used. Interior to the housing 145 is an endless spine 152 journalled on sprockets 154 in all respects similar to the spine sprocket arrangement illustrated in FIG. 7 except that the optimal pivoting sprocket 99 and its associated tension mechanism may not be employed or may be replaced by mounting one of the sprockets 154 on a sliding plate 146 locked in position by a bolt 148 to set a desired tension in the spine 152. The spines 154 of the horizontal cane pruners 130 are equipped with fittings 157 in which prongs 159 are mounted and radiate outwardly from the housing 145. As seen in FIGS. 3 and 4, the spines 154 and therefore the prongs 159 are driven by motors 161, preferably hydraulic, so that the prongs 159 travel downwardly on the vine side of the housing 145. As seen in FIG. 8, the hedger teeth 151 are directed toward the vine and preferably angled at approximately 15 degrees inwardly from top to bottom and the path of travel 163 of the prongs 159 is preferably at an angle 165 of approximately 135 degrees relative to the front edge of the reciprocating cutting teeth 151. These angles may differ over a wide range. The hedger 149 is positioned on the housing 145 such that the prongs 159 pass the leading edge of the cutting teeth 151 along an intermediate portion of the hedger 149. As can best be seen in FIG. 3, the horizontal cane pruners 130 are also provided with horizontal disks 167 rotatively mounted on the horizontal cane pruners 130 in a fashion similar to that of the disks 113 on the vertical cane pruners 70 as illustrated in FIGS. 5 and 6. The disks 167 are preferably maintained in a horizontal condition and the horizonal cane pruners support frames are preferably adjustable so that this horizontal condition can be maintained regardless of the selected attitude of the horizontal cane pruners 130. Preferably, the disks 167 partially vertically overlap at their forwardmost position. Tubular members 169 may also be provided which would extend from the housing 145 to the support arm 131 or 133 associated with the housing 145 to shield the pruner 130 from obstacles. Sections of ⅜ inch flexible rubber hose, preferably extending four to twelve inches beyond the housing 145, have been found to work well as prongs 159, the degree of flexibility being selected to accommodate the strength of the vines to be gathered.

Turning once again to FIG. 4, a mechanism for controlling the elevation of the pruning machine relative to the top of the vine to be pruned is shown. A trellis sled 171 is pivotally connected to a rearward end of an arm 173 and the forward end of the arm 173 is pivotally connected to the suspension carriage 30. Preferably, the sled 171 is centered on a rear portion of the carriage 30 and rides atop the vine canopy as the pruning machine travels along the trellis. A linkage 175 connects the arm 173 to a switch 177 so that, as the sled 171 rises above a threshold elevation, the switch 177 is thrown into an up position 179 or, as the sled falls below that elevation, the switch 177 is thrown into a down position 181. The switch 177 is connected in the control circuit of the mast solenoid 17 so that as the top elevation of the vine canopy changes, the mast 11 is automatically raised and lowered to properly position the elevation of the vertical and horizontal cane pruners 70 and 130 relative to the vine elevation.

As shown in FIG. 4, the rear outboard post 53 is mounted to the suspension carriage 30 by a bracket 182 which pivots on the suspension carriage 30 to permit the lower end of the post 53 to swing rearwardly from its vertical position. A biasing spring 183 is connected between the post 53 and an arm 184 fixed to the suspension carriage 30 or the bracket 182. This arrangement permits the clearance of obstacles struck by the horizontal caning pruner 130 or its supporting structure by the rearward and upward rotation of the horizontal caning pruner 130 as well as by the rotating pivot joints 135. A similar port pivot can be employed with the rear inboard post 55.

Figure 9:
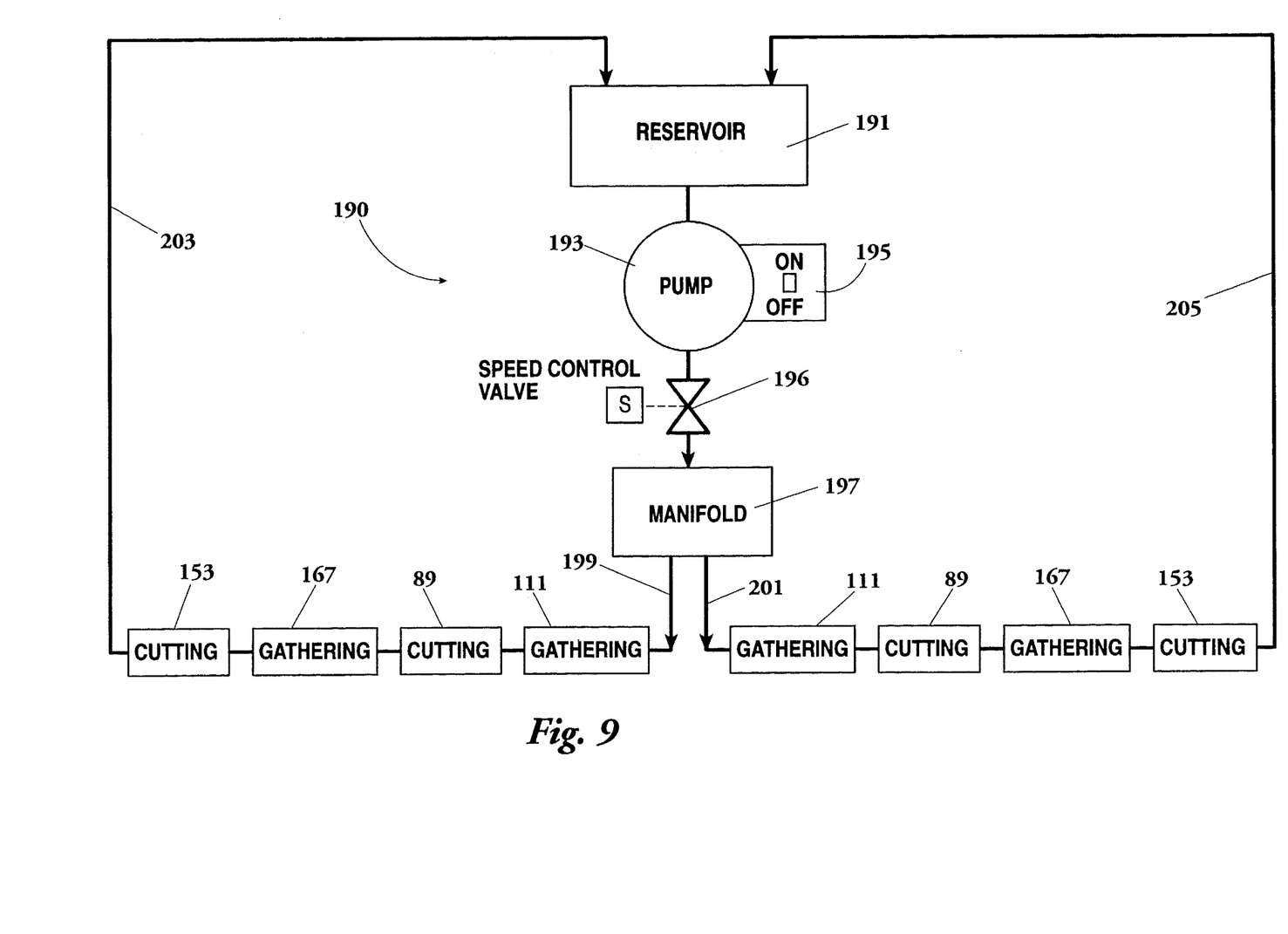
FIG. 9 is a schematic diagram illustrating a preferred embodiment of an hydraulic pruner drive circuit.

Turning now to FIG. 9, the hydraulic system 190 of the pruning machine is illustrated. As shown, in the preferred arrangement, a low pressure, high volume hydraulic system is used including an hydraulic fluid reservoir 191, preferably on the transport vehicle, connected through a pump 193 controlled by an on/off switch 195 in the vehicle to provide fluid, preferably through a speed control valve 196, to a manifold 197 mounted on the suspension carriage 30. From the manifold 197 the system is divided into inboard 199 and outboard 201 hydraulic fluid paths. The inboard and outboard hydraulic fluid paths 199 and 201 each include the series connection of the vertical cane pruner spine motor 111, the vertical cane pruner cutter drive motor 89, the horizontal cane pruner spine motor 167 and the horizontal cane pruner cutter drive motor 153. Following these series connections, the inboard hydraulic flow path includes a return line 203 and the outboard hydraulic flow path includes a return line 205, both extending to the reservoir 191. Thus, the simultaneous operation of all of the pruner drive motors is accomplished under control of the vehicle operator from the vehicle during the pruning process.

In operation, the operator first manually sets the desired elevations of the carriage posts 49, 51, 53 and 55 and therefore of the vertical and horizontal vine pruners 70 and 130 relative to the suspension carriage 30 by aligning the appropriate post holes 67 with their associated pins. The operator then manually adjusts the support arm structures of the vertical and horizontal cane pruners 70 and 130 to achieve the desired forwardmost positions and angular attitudes or orientation of the pruners 70 and 130 and further adjusts spring tensions of the pruner pivot arms. All of these adjustments are made based on the particular requirements and preferences of the operator and on the vine conditions of a particular application. With the elevation of the pruners 70 and 130 set in relation to the suspension carriage 30, the elevation of the mast 11 is varied by use of the mast solenoid 17 and cylinder 15 to set a base or threshold elevation of the carriage 30 relative to ground level, primarily to accommodate the average elevation of the vine to be pruned. The position of the boom 19 is then adjusted by use of the boom solenoid 23 and cylinder 21 to extend the carriage 30 a desired distance from the vehicle so as to comfortably accommodate the width of the vine canopy to be pruned. The post support arms 41, 43, 45, and 47 are then telescoped to open the space between the inboard and outboard vertical cane pruners 70 and horizontal cane pruners 130, so that the end of the vine trellis can be admitted into the pruning machine. Typically, an expansion of approximately six inches is sufficient. Once the trellis is admitted into the machine, the arms 41, 43, 45 and 47 are again telescoped to close the space between the inboard and outboard vertical cane pruners 70 and horizontal cane pruners 130. The sled 171 rides atop the vine canopy and, as the sled 171 rises and falls above and below the desired base or threshold level, the switch 177 operates in response to the arm 173 to cause the mast to change elevation so that the pruning machine is responsive to the vine elevation. The pruner hydraulic system, such as that shown in FIG. 9, is then turned on. Preferably, the hedger motors 89 and 153 operate at a higher speed than the gathering motors 111 and 167 as a result of the inherent characteristics of the motors.

Speed of all the motors is controlled by the valve 196. As the vehicle travels along the path of travel T lateral of the vines, the vertical canes are gathered by the rotating prongs 109 on the vertical cane pruners 170 and brought into the vertical cane pruner hedger 81 to trim the vertical canes, cutting the quality fruiting wood to its desired length. During this process, the rods 119 will guide the trimmed and desirable one year old canes outwardly away from the reach of the horizontal cane pruners 130. If obstacles would impede the path of the vertical cane pruners 70, the disks 113 coming into contact with those obstacles will cause the vertical cane pruners 70 to rotate on their pivot joints 71 to clear the obstacles and then return under bias to the operating position. In addition, the posts 53 and 55 may also rotate rearwardly under bias to clear obstacles in the path of the pruners 130. Similarly, the rotating prongs 159 of the horizontal cane pruners 130 will gather the weaker, inferior and shaded canes and guide them into the cutters of the horizontal cane pruners 130. The disks 167 of the horizontal cane pruners 130 will cause the horizontal cane pruners to adjust to obstacles in their path, causing the horizontal cane pruners to rotate clear of the obstacles and then to return under bias to the normal operating position. If the pruners 70 and 130 are provided with floating sprockets 99 as illustrated in FIG. 7, then, should any of the prongs 109 or 159 become tangled in the vine, the force against the prongs 109 or 159 will cause the sprocket 99 to shift its position, releasing the tension in the spine 93 and therefore allowing the prongs to realign themselves under the force of the vine so as to release the prongs 109 or 159.

While the gathering mechanisms of the vertical and horizontal cane pruners 70 and 130 are described in relation to a forward leg defined by two sprockets so as to enable the prongs to draw gathered canes a greater distance from the trellis, a wheel having radial teeth on its outer circumference for engaging the canes could also be used. However, such an arrangement would not afford as great protection to the trimmed vertical canes from the horizontal cane pruners 130, since those canes would not be drawn as far from the trellis and the shielding rods 119 holding the trimmed vertical canes away from the trellis would have to be closer together in order to catch the canes after they were released by the prongs of the vertical cane pruners 70. It should also be noted that, in practice, the hedger of the horizontal cane pruners 130 can be mounted either in front of or in back of the corresponding rotating prongs and the direction of rotation of the spine of the horizontal cane pruners 130 can be reversed as well.

The configuration, pivots and biasing mechanisms of the structures connecting the pruners 70 and 130 to their posts 49, 51, 53, and 55 can be accomplished in any known manner. The power system of the machine can be hydraulic, pneumatic, electrical, mechanical or any combination thereof.

Thus, it is apparent that there has been provided, in accordance with the invention, a single curtain grape vine pruner that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A vine cane pruner comprising:
   a hedger mounted on a ground engaging frame with a direction of travel having cutting teeth extending forwardly of said hedger in relation to said direction; and
   means mounted on said hedger for engaging canes not otherwise in a path of said cutting teeth to draw said canes into said cutting teeth.

2. A pruner according to claim 1, said engaging and drawing means comprising an endless series of spaced apart prongs travelling along a continuous path.

3. A pruner according to claim 2, said continuous path being elongated to extend between a cane gathering end thereof and said cutting teeth of said hedger.

4. A pruner according to claim 3, said prongs extending beyond said cutting teeth and beyond an inlet end of said hedger as said prongs travel along a forward leg of said continuous path.

5. A vine cane pruner comprising:
   a housing;
   a substantially planar reciprocating hedger mounted on said housing and having cutting teeth extending forwardly of said housing;
   an endless spine journalled for travel in said housing along a continuous planar path; and
   a plurality of prongs spaced apart on and radiating from said spine and extending immediately forward of and beyond said cutting teeth as said plurality of prongs travels along a forward leg of said path.

6. A pruner according to claim 5, said forward leg of said continuous planar path being elongated from a cane gathering end thereof to a cane releasing end thereof.

7. A pruner according to claim 6, said forward leg being substantially parallel to a direction of reciprocation of said teeth.

8. A pruner according to claim 6, said forward leg intersecting a leading edge of said cutting teeth.

9. A vine cane pruner comprising:
   a frame adapted for ground travel;

a first hedger mounted on said frame and having cutting teeth extending forwardly therefrom in relation to a direction of travel of said frame;

means mounted on said first hedger for engaging vertical canes not otherwise in a path of said first hedger cutting teeth and for drawing said engaged vertical canes into said cutting teeth of said first hedger;

a second hedger mounted on said frame rearwardly of said first hedger and having cutting teeth extending forwardly therefrom in relation to said direction of travel; and means mounted on said second hedger for engaging horizontal canes not otherwise in a path of said second hedger cutting teeth and for drawing said engaged horizontal canes into said cutting teeth of said second hedger.

10. A vine cane pruner comprising:

a frame;

a first hedger mounted on said frame and having cutting teeth extending forwardly therefrom;

means mounted on said first hedger for engaging vertical canes of the vine and for drawing engaged vertical canes into said cutting teeth of said first hedger;

a second hedger mounted on said frame rearwardly of said first hedger and having cutting teeth extending forwardly therefrom;

means mounted on said second hedger for engaging horizontal canes of the vine and for drawing engaged horizontal canes into said cutting teeth of said second hedger; and means connected between said frame and a transport vehicle for selectively raising and lowering said frame.

11. A pruner according to claim 10 further comprising means connected between said frame and the transport vehicle for selectively shifting said frame laterally closer to and further from the vehicle.

12. A vine cane pruner comprising:

a frame;

a first hedger mounted on one side of said frame and having cutting teeth extending forwardly therefrom;

means mounted on said first hedger for engaging vertical canes of one side of the vine and for drawing engaged vertical canes into said cutting teeth of said first hedger;

a second hedger mounted on said frame rearwardly of said first hedger and having cutting teeth extending forwardly therefrom;

means mounted on said second hedger for engaging horizontal canes of the one side of the vine and for drawing engaged horizontal canes into said cutting teeth of said second hedger;

a third hedger mounted on another side of said frame and having cutting teeth extending forwardly therefrom;

means mounted on said third hedger for engaging vertical canes of another side of the vine and for drawing engaged vertical canes into said cutting teeth of said third hedger; and a fourth hedger mounted on said frame rearwardly of said third hedger and having cutting teeth extending forwardly therefrom;

means mounted on said fourth hedger for engaging horizontal canes of the other side of the vine and for drawing engaged horizontal canes into said cutting teeth of said fourth hedger.

13. A pruner according to claim 12 further comprising means connected between said frame and a transport vehicle for selectively raising and lowering said frame.

14. A pruner according to claim 12 further comprising means connected between said frame and the transport vehicle for selectively shifting said frame laterally closer to and further from the vehicle.

15. A pruner according to claim 12 further comprising means connected between said frame and at least one of said first and third hedgers for selectively varying a distance between said first and third hedgers.

16. A pruner according to claim 12 further comprising means connected between said frame and at least one of said second and fourth hedgers for selectively varying a distance between said third and fourth hedgers.

17. A vine cane pruner comprising:

a housing;

a substantially planar reciprocating hedger mounted on said housing and having cutting teeth extending forwardly of said housing from an inlet end to an outlet end of said hedger;

an endless spine journalled in said housing along a continuous planar path substantially parallel to said hedger, said path having a forward leg extending rearwardly of and below said cutting teeth for at least a substantial portion of said hedger for travel along said leg in a direction from said inlet toward said outlet end of said hedger; and a plurality of prongs spaced apart on and radiating from said spine and extending forwardly of and below said cutting teeth and beyond said inlet end of said hedger as said plurality of prongs travels along said forward leg of said path.

18. A pruner according to claim 17 further comprising means mounted on said housing for reciprocally driving a sliding tooth plate of said hedger in relation to a fixed tooth plate of said hedger.

19. A pruner according to claim 17 further comprising means mounted on said housing for driving said endless spine along said continuous path.

20. A vine cane pruner comprising:

a suspension frame;

a forward housing mounted on said suspension frame;

a first substantially planar reciprocating hedger mounted on said forward housing and having cutting teeth extending forwardly of said forward housing from an inlet end to an outlet end of said first hedger;

a first endless spine journalled on said forward housing along a continuous planar path substantially parallel to said first hedger, said path having a forward leg extending rearwardly of and below said cutting teeth for at least a substantial portion of said first hedger for travel along said leg in a direction from said inlet end toward said outlet end of said first hedger;

a plurality of prongs spaced apart on and radiating from said first spine and extending forwardly of and below said cutting teeth and beyond said inlet end of said first hedger as said plurality of prongs travels along said forward leg of said path;

a rearward housing mounted on said suspension frame;

a second substantially planar reciprocating hedger mounted on said rearward housing and having cutting teeth extending forwardly of said rearward housing from an inlet end to an outlet end of said second hedger;

a second endless spine journalled on said rearward housing along a continuous planar path substantially parallel to said second hedger said path having a forward leg extending angularly across and below said cutting teeth of said second hedger for travel along said leg in a direction toward said cutting teeth of said second hedger; and a plurality of long, resiliently flexible prongs spaced apart on and radiating from said second spine and extending substantially beyond said inlet end and short of said outlet end of said second hedger as said plurality of long prongs travels along said path.

21. A pruner according to claim 20 further comprising means mounted on said forward housing for reciprocally driving a sliding tooth plate of said first hedger in relation to a fixed tooth plate of said first hedger.

22. A pruner according to claim 20 further comprising means mounted on said forward housing for driving said first endless spine along said continuous path.

23. A pruner according to claim 20 further comprising means mounted on said rearward housing for reciprocally driving a sliding tooth plate of said second hedger in relation to a fixed tooth plate of said second hedger.

24. A pruner according to claim 20 further comprising means mounted on said rearward housing for driving said second endless spine along said continuous path.

* * * * *